Figure 1:
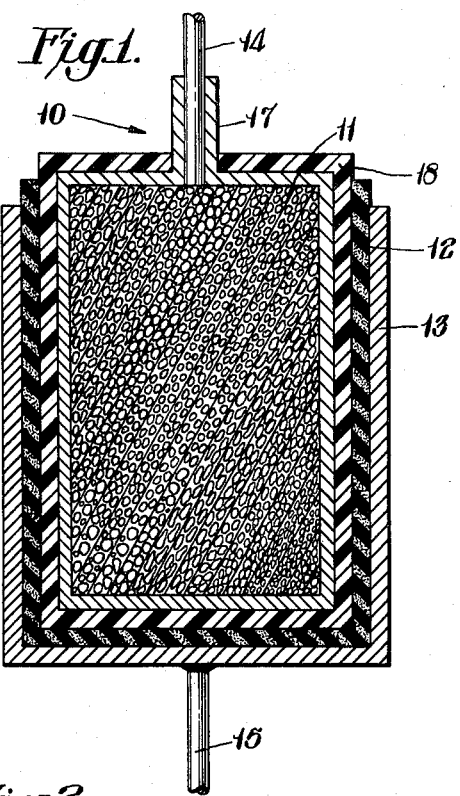

Oct. 26, 1965  S. D. ROSS ET AL  3,214,650

SOLID ELECTROLYTE CAPACITOR

Filed Dec. 31, 1962

INVENTORS
Sidney D. Ross
Raymond C. Petersen
Manuel Finkelstein
BY Connolly and Hutz
ATTORNEYS

3,214,650
SOLID ELECTROLYTE CAPACITOR
Sidney D. Ross and Raymond C. Petersen, Williamstown, and Manuel Finkelstein, North Adams, Mass., assignors to Sprague Electric Company, North Adams, Mass., a corporation of Massachusetts
Filed Dec. 31, 1962, Ser. No. 248,593
5 Claims. (Cl. 317—230)

This invention relates to a solid electrolyte capacitor and to a method of making the same, and more particularly to the article and a method of producing a solid electrolyte capacitor having a semiconductive component. This is a continuation-in-part of Serial No. 117,921 filed June 19, 1961.

Solid electrolyte capacitors that are presently known to the art have an anode of a valve-metal, usually a sintered pellet of tantalum particles. The exposed surfaces of the anode are provided with an oxide coating ("formed") which serves as the active dielectric of the capacitor. A layer of a solid electrolyte is produced in contact with the dielectric, and is usually manganese dioxide for tantalum anodes and lead peroxide for aluminum anodes. The production of the solid electrolyte layer involves high temperatures, for example, the pyrolytic decomposition of manganous nitrate to manganese dioxide is preferably conducted at temperatures in excess of 350° C. In order to ensure that the oxide coated surfaces of the pores of a sintered pellet are completely coated with the solid electrolyte, it is necessary to resort to multiple passes through the high decomposition temperatures. The multiple exposure to the high temperatures involved in producing the solid electrolyte layer are disadvantageous because of the likelihood of injury to the easily damaged oxide film. A counter electrode, or contact electrode, is provided by depositing a metallic conductor on the solid electrolyte layer to permit the attachment of a cathode terminal to the capacitor.

The solid electrolyte of the prior art is considered to function according to two generally accepted theories of operation. Healing of faults in the oxide dielectric layer is considered to be obtained by the solid electrolyte yielding oxygen to the exposed anode metal at the fault to oxidize the metal and thereby complete the oxide layer. The solid electrolyte is also considered to be reduced, by the high temperatures produced by shorting at a fault in the oxide layer, to a lower non-conducting oxide which forms an insulating barrier at the point of the fault. In either case, the solid electrolyte must undergo change to rid the dielectric of faults that are almost entirely the result of the high temperature processing of the solid electrolyte.

Another solid capacitor in the prior art has an anode of a valve-metal, usually titanium because of the high dielectric constant of its oxide. The anode is "formed" to provide a dielectric, e.g. titanium dioxide. Then the counter electrode is applied by depositing a metallic conductor directly onto the dielectric oxide. There are two principal disadvantages to this type of solid capacitor; namely, shorting between counter electrode and anode frequently occurs through pin-holes or other imperfections in the oxide film, and it is difficult to attach terminals to the thin counter electrode.

It is an object of this invention to produce a solid electrolyte capacitor that is not subject to the shortcomings of the solid electrolyte capacitors of the prior art.

It is another object of this invention to provide a method for producing a solid electrolyte capacitor that inflicts a minimum of injury to the dielectric film of the capacitor.

Figure 2:
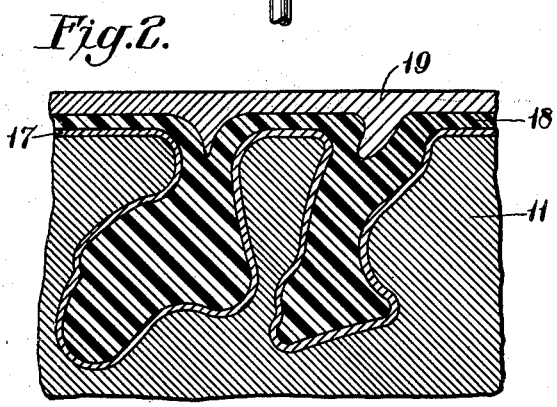

These and other objects of this invention will become apparent upon consideration of the specification and claims in view of the accompanying drawing, in which:

FIGURE 1 is a vertical cross-section of a solid electrolyte capacitor constructed in accordance with this invention; and FIGURE 2 is a diagrammatic representation of the relative position of the layers of the preferred embodiment of this invention.

In general, the objects of this invention are attained by a capacitor comprising a valve-metal anode coated with an oxide dielectric and having a layer of a solid organic material in intimate contact with the dielectric.

In a restricted sense, an object of this invention is attained by a capacitor comprising an anode of a porous pellet of sintered tantalum particles. All the pores and surfaces of the tantalum anode are coated with tantalum oxide to provide the active dielectric of the capacitor. A layer of a solid organic semiconductor is provided in intimate contact with the dielectric to serve as the counter electrode, or cathode, of the capacitor. Contact to the cathode is obtained through a metallic conductor applied over the organic semiconductor.

While one of the preferred embodiments of this invention utilizes a porous tantalum pellet, the invention should be understood as not being restricted thereto. The invention is to be considered to include other film-forming metals, such as aluminum, niobium, and titanium; and other anode structures, such as foil and wire.

The present invention, by using conducting (semiconductor) organic materials, permits the cathode layer to be deposited on the surface of the oxide dielectric without the use of temperatures high enough to damage the dielectric. This may be done, for example, by impregnating the anode (preferably in vacuo) with a solution of the conducting material in a suitable solvent. The solvent should be capable of dissolving a substantial amount of the conducting organic material and should be reasonably volatile (boiling below 125° C. for example).

It is a feature of this invention that this operation is carried on in a manner and at a temperature which is within the operating temperature of the resultant capacitor. It is thus possible to achieve the application of the semiconductive layer to the dielectric film without the necessity of later reforming the dielectric film. The dielectric film is thus retained as the desired dense, thin, non-porous, uniform, and continuous film on the metal of the capacitor anode. The semiconductive layer of this invention is applied so as to be in intimate continuous dry contact with the dielectric film, with moisture or other contamination having been avoided.

Another feature of this invention is that the process is admirably successful with aluminum anodes, whereas past constructions have suffered in attempts to extend solid capacitor processes to aluminum because of the more fragile nature of aluminum oxide films.

The two compounds which are suitable for the cathode of this invention are quaternary ammonium complex salts of tetracyanoquinodimethane (TCNQ). The quaternary ammonium ions employed are the N-allylpyridinium and tetraallylammonium ions. Each salt molecule contains one quaternary ammonium ion, one TCNQ anion-radical and one neutral TCNQ molecule. Both salts have low resistivities, about 30 ohm-cm. as compressed powders at room temperature. These compounds are more soluble in most solvents than are the compounds described in the parent application. They are, therefore, easier to deposit from solution. Suitable solvents are hydrocarbons, alcohols, chloroform, acetonitrile, and acetone, the latter being preferred. Cathode material is applied to "formed" anodes in a saturated or very concentrated solution.

The above-identified organic charge-transfer type complexes are set forth in the following table. The left-hand column identifies the complex which is prepared by reacting the corresponding ammonium salt (e.g. iodide) with the 7,7,8,8-tetracyanoquinodimethane (TCNQ) in solution from which the desired complex is then crystallized. The second column shows the molar ratio of the electron donor A to the acceptor B. The approximate resistivity in ohm-cm. at room temperature is shown in the third column.

TABLE

| Complex A—B | Molar Ratio (A:B) | Resistivity (in ohm-cm. at room temp.) |
| --- | --- | --- |
| 1. N-allylpyridinium—TCNQ | 1:2 | 30 |
| 2. Tetraallylammonium—TCNQ | 1:2 | 30 |

*Example I*

A preferred embodiment of a capacitor constructed according to the present invention is shown in FIGURE 1. A capacitor 10 has a porous anode 11 formed of coherent sintered tantalum particles in the manner of pellet preparation disclosed in U.S. Patent 2,936,514. It will be understood that this invention is not limited to a porous sintered anode; both foil and wire anodes are employed advantageously according to this invention.

The pellet anode 11 is "formed" with a dielectric film in a suitable electrolyte by the imposition of a current flow. One suitable formation electrolyte is a solution of phosphoric acid. The pellet anode 11 is formed at a suitable current density. After the current has decreased to an acceptable value the formed anode is removed from solution and prepared for the reception of the semiconductive material according to this invention.

The semiconductive material is applied by dipping or immersing the anode in a solution of either of the organic charge-transfer complexes described above. The organic compound is dissolved in a solvent which is readily volatilized in the temperature range from room temperature to not more than 125° C. The immersing and evaporation steps are conducted at temperatures of less than 125° C. and well within the temperatures in which the resultant capacitor is intended to operate. It is to be understood to be within the scope of this invention to conduct these steps in vacuo. The coat of semiconductive material is built up on the pellet anode 11 by filling the interstices between the sintered particles and forming an outer coat 18 on the anode 11. A contact electrode is prepared on the outside of the coated pellet anode 11 by applying a metallic coating 13, e.g. silver, with or without a foundation layer 12 of graphite. A lead 14 extends from the pellet anode 11, and another lead 15 is connected to the coating 13 to complete the capacitor construction. The entire unit is encased in a suitable capacitor container, e.g. a metallic can having glass-to-metal end seals.

FIGURE 2 graphically illustrates the relationship between the pellet anode 11, the dielectric film 17 formed on the anode 11, and the semiconductive coat 18 in intimate contact with the dielectric film 17. FIGURE 2 demonstrates the continuous intimate contact between these three parts which is achieved by means of this invention. The terminal electrode 19 is shown in contact with the coat 18.

*Example II*

The following is an illustration of the use of the subject complexes in an aluminum electrolytic capacitor section. A rolled foil aluminum electrolytic capacitor section, consisting of an anode foil electrolytically oxidized to 70 volts, porous paper spacer and an aluminum cathode, having nominal ratings of 10 mfd., 50 volts when used with an electrolyte, was impregnated several times with a concentrated acetone solution of the N-allylpyridinium-TCNQ salt and solvent acetone was removed in vacuo each time. The treated section was then measured for capacitance and was found to have 10.2 mfd. and was then charged to 50 volts and held at that voltage for three hours during which time the leakage current decayed to about 5 microamperes. Capacity was re-measured and found to be 10.1 mfd. This indicates that the charging process had caused no substantial change to take place in either the oxide or the conducting material.

*Example III*

In another capacitor experiment, two thin films of aluminum were deposited on a single glass microscope slide, separated by a distance of about 0.5 cm. One of these film was oxidized electrolytically to 40 volts over a surface of about 1 square centimeter. The slide was then washed and dried and a thin film of the N-allylpyridinium TCNQ salt was deposited from acetone solution covering the oxide film and spanning the gap between the oxide-covered aluminum and the unoxidized aluminum films. The assembly was dried in vacuo and capacity was measured and found to be 0.0135 mfd. The capacitor was then charged to 36 volts (90% of the formation voltage) with the oxidized aluminum as anode. Charging current was readily measurable, but the current fell rapidly to zero (not detechable under conditions that would show 0.2 microamp).

The advantages found with the use of the above organic charge-transfer complexes for the semiconductive layer relate primarily to the fact that there is no destruction of the oxide dielectric film during processing. In other words, the dielectric film in the finished capacitor has the properties and advantages including the voltage capabilities of the oxide film as originally formed on the anode body. The repeated reformation of the film necessary in the solid electrolyte capacitor of the art is completely avoided by the use of the present material, because the excessive high temperatures required heretofore for pyrolytic decompositions are no longer required with the use of the organic semiconductive material of this invention. In a like manner, the temperatures of this invention avoid the shorting that frequently occurs with the evaporated metal cathode type of solid capacitor of the art.

Various changes and modifications may be made in the above description without departing from the scope or spirit hereof. Therefore, this invention is limited only by the scope of the appended claims.

What is claimed is:

1. In a capacitor having an electrode of film-forming metal, another electrode and a solid spacer between and in intimate contact with both electrodes, the improvements whereby said spacer includes a dielectric oxide film formed on said film-forming electrode and a second film of a quaternary ammonium complex salt of tetracyanoquinodimethane disposed directly on said oxide film and adhering thereto, the quaternary ammonium ion component of said salt being selected from the group consisting of N-allylpyridinium and tetraallylammonium ions.

2. In a capacitor having a tantalum electrode, another electrode and a solid spacer between and in intimate contact with both electrodes, the improvement whereby said spacer includes a dielectric oxide film formed on said film-forming electrode and a second film of a quaternary ammonium complex salt of tetracyanoquinodimethane disposed directly on said oxide film and adhering thereto, the quaternary ammonium ion component of said salt being selected from the group consisting of N-allylpyridinium and tetraallylammonium ions.

3. In a capacitor having an aluminum electrode, another electrode and a solid spacer between and in intimate contact with both electrodes, the improvement whereby said spacer includes a dielectric oxide film formed on said film-forming electrode and a second film of a quaternary ammonium complex salt of tetracyanoquinodimethane disposed directly on said oxide film and adhering thereto, the quaternary ammonium ion component of said salt being selected from the group consisting of N-allylpyridinium and tetraallylammonium ions.

4. A capacitor comprising a tantalum electrode, a counter electrode and a solid spacer between and in intimate contact with both electrodes, said spacer comprising tantalum oxide and a film thereon of a quaternary ammonium complex salt of tetracyanoquinodimethane disposed directly on said oxide film and adhering thereto, the quaternary ammonium ion component of said salt being selected from the group consisting of N-allylpyridinium and tetraallylammonium ions.

5. A capacitor comprising an aluminum electrode, a counter electrode and a solid spacer between and in intimate contact with both electrodes, said spacer comprising aluminum oxide and a film thereon of a quaternary ammonium complex salt of tetracyanoquinodimethane disposed directly on said oxide film and adhering thereto, the quaternary ammonium ion component of said salt being selected from the group consisting of N-allylpyridinium and tetraallylammonium ions.

No references cited.

JOHN W. HUCKERT, *Primary Examiner.*